(12) United States Patent
Ormazabal et al.

(10) Patent No.: US 9,077,685 B2
(45) Date of Patent: *Jul. 7, 2015

(54) SYSTEMS AND METHODS FOR IMPLEMENTING A PROTOCOL-AWARE NETWORK FIREWALL

(75) Inventors: Gaston S. Ormazabal, New York, NY (US); Henning G. Schulzrinne, Leonia, NJ (US); Eilon Yardeni, Brooklyn, NY (US); Jonathan Lennox, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/239,986

(22) Filed: Sep. 22, 2011

(65) Prior Publication Data

US 2012/0008624 A1 Jan. 12, 2012

Related U.S. Application Data

(63) Continuation of application No. 11/557,703, filed on Nov. 8, 2006, now Pat. No. 8,027,251.

(60) Provisional application No. 60/734,318, filed on Nov. 8, 2005.

(51) Int. Cl.
*H04L 12/28* (2006.01)
*H04L 29/06* (2006.01)

(52) U.S. Cl.
CPC ...... *H04L 63/0263* (2013.01); *H04L 29/06027* (2013.01); *H04L 63/029* (2013.01); *H04L 65/1006* (2013.01)

(58) Field of Classification Search
None
See application file for complete search history.

(56) References Cited

U.S. PATENT DOCUMENTS

| | | |
|---|---|---|
| 5,414,704 A | 5/1995 | Spinney |
| 5,465,286 A | 11/1995 | Clare et al. |
| 5,473,607 A | 12/1995 | Hausman et al. |
| 5,828,653 A | 10/1998 | Goss |
| 5,859,980 A | 1/1999 | Kalkunte |
| 5,909,686 A | 6/1999 | Muller et al. |
| 5,936,962 A | 8/1999 | Haddock et al. |
| 5,991,270 A | 11/1999 | Zwan et al. |
| 6,154,775 A | 11/2000 | Coss et al. |
| 6,175,902 B1 | 1/2001 | Runaldue et al. |
| 6,680,089 B2 | 1/2004 | Miyake et al. |
| 6,701,346 B1 | 3/2004 | Klein |
| 6,707,817 B1 | 3/2004 | Kadambi et al. |
| 6,816,910 B1 | 11/2004 | Ricciulli |

(Continued)

OTHER PUBLICATIONS

Kuthan, et al., "Middlebox Communication: Framework and Requirements—Internet Draft," Internet Engineering Task Force (IETF), http://tools.ietf.org/html/draft-kuthan-midcom-framework-00, 26 pages, Internet Engineering Task Force, Nov. 2000.

(Continued)

*Primary Examiner* — Donald Mills

(57) ABSTRACT

A method may include receiving a first packet; determining, in a first processor, whether the first packet meets a criterion to be forwarded to a destination indicated in the first packet; receiving a second packet; determining whether the second packet is of a type for changing the criterion and sending the second packet to a second processor if the second packets is of the type for changing the criterion; receiving instructions, based on the second packet sent to the second processor, to change the criterion; and changing the criterion.

19 Claims, 11 Drawing Sheets

(56) References Cited

U.S. PATENT DOCUMENTS

| | | |
|---|---|---|
| 6,826,616 B2 | 11/2004 | Larson et al. |
| 6,880,089 B1 | 4/2005 | Bommareddy et al. |
| 6,920,107 B1 | 7/2005 | Qureshi et al. |
| 6,930,598 B2 | 8/2005 | Weiss |
| 6,934,756 B2 | 8/2005 | Maes |
| 7,007,299 B2 | 2/2006 | Ioele et al. |
| 7,072,291 B1 | 7/2006 | Jagadeesan et al. |
| 7,076,393 B2 | 7/2006 | Ormazabal et al. |
| 7,254,832 B1 | 8/2007 | Christie |
| 7,340,166 B1 | 3/2008 | Sylvester et al. |
| 7,385,927 B2 | 6/2008 | Gygi et al. |
| 7,385,931 B2 | 6/2008 | Magnaghi et al. |
| 7,421,734 B2 | 9/2008 | Ormazabal et al. |
| 7,440,573 B2 | 10/2008 | Lor et al. |
| 7,499,405 B2 | 3/2009 | Gilfix et al. |
| 7,634,249 B2 | 12/2009 | Hahn et al. |
| 7,653,938 B1 | 1/2010 | Touitou et al. |
| 7,672,336 B2 | 3/2010 | Bharrat et al. |
| 7,716,725 B2 | 5/2010 | Xie |
| 7,721,091 B2 | 5/2010 | Iyengar et al. |
| 8,027,251 B2 * | 9/2011 | Ormazabal et al. ........... 370/230 |
| 2002/0083187 A1 | 6/2002 | Sim et al. |
| 2002/0112073 A1 | 8/2002 | MeLampy et al. |
| 2002/0156903 A1 * | 10/2002 | Bach Corneliussen ....... 709/228 |
| 2003/0009561 A1 * | 1/2003 | Sollee ............................ 709/227 |
| 2003/0055931 A1 | 3/2003 | Cravo De Almeida et al. |
| 2003/0076780 A1 | 4/2003 | Loge et al. |
| 2003/0086425 A1 | 5/2003 | Bearden et al. |
| 2003/0093562 A1 | 5/2003 | Padala |
| 2003/0093563 A1 | 5/2003 | Young et al. |
| 2003/0115321 A1 | 6/2003 | Edmison et al. |
| 2003/0117961 A1 | 6/2003 | Chuah et al. |
| 2003/0120816 A1 * | 6/2003 | Berthaud et al. ............. 709/248 |
| 2003/0126464 A1 | 7/2003 | McDaniel et al. |
| 2003/0135639 A1 | 7/2003 | Marejka et al. |
| 2003/0165136 A1 | 9/2003 | Cornelius et al. |
| 2003/0195861 A1 | 10/2003 | McClure et al. |
| 2004/0001443 A1 | 1/2004 | Soon et al. |
| 2004/0013086 A1 | 1/2004 | Simon et al. |
| 2004/0015579 A1 * | 1/2004 | Cooper et al. ................ 709/223 |
| 2004/0028035 A1 | 2/2004 | Read |
| 2004/0034793 A1 | 2/2004 | Yuan |
| 2004/0039938 A1 | 2/2004 | Katz et al. |
| 2004/0068668 A1 | 4/2004 | Lor et al. |
| 2004/0128554 A1 | 7/2004 | Maher et al. |
| 2004/0133772 A1 | 7/2004 | Render |
| 2004/0136379 A1 | 7/2004 | Liao et al. |
| 2004/0208186 A1 | 10/2004 | Eichen et al. |
| 2004/0236966 A1 | 11/2004 | D'Souza et al. |
| 2004/0244058 A1 | 12/2004 | Carlucci et al. |
| 2004/0255156 A1 * | 12/2004 | Chan et al. .................... 713/201 |
| 2005/0018618 A1 | 1/2005 | Mualem et al. |
| 2005/0050377 A1 | 3/2005 | Chan et al. |
| 2005/0076235 A1 | 4/2005 | Ormazabal et al. |
| 2005/0165917 A1 | 7/2005 | Le et al. |
| 2005/0201320 A1 * | 9/2005 | Kiss et al. ..................... 370/328 |
| 2005/0201357 A1 * | 9/2005 | Poyhonen ..................... 370/352 |
| 2005/0232229 A1 | 10/2005 | Miyamoto et al. |
| 2006/0007868 A1 | 1/2006 | Shinomiya |
| 2006/0013192 A1 * | 1/2006 | Le et al. ........................ 370/351 |
| 2006/0075084 A1 | 4/2006 | Lyon |
| 2006/0075132 A1 * | 4/2006 | Liu ............................... 709/236 |
| 2006/0077981 A1 | 4/2006 | Rogers |
| 2006/0146792 A1 | 7/2006 | Ramachandran et al. |
| 2006/0165060 A1 * | 7/2006 | Dua ............................... 370/352 |
| 2006/0227766 A1 | 10/2006 | Mickle et al. |
| 2007/0022479 A1 | 1/2007 | Sikdar et al. |
| 2007/0110053 A1 | 5/2007 | Soni et al. |
| 2007/0118894 A1 | 5/2007 | Bhatia |
| 2007/0121596 A1 | 5/2007 | Kurapati et al. |
| 2007/0192863 A1 | 8/2007 | Kapoor et al. |
| 2008/0037447 A1 | 2/2008 | Garg et al. |
| 2008/0040801 A1 | 2/2008 | Buriano et al. |

OTHER PUBLICATIONS

Rosenberg, et al., "SIP: Session initiation Protocol—RFC 3261," Network Working Group, The Internet Society, 269 pages, Jun. 2002.

Sisalem, et al., "Denial of Service Attacks Targeting a SIP VoIP Infrastructure: Attack Scenarios and Prevention Mechanisms", IEEE Network, vol. 20, Issue: 5, Publication Year: 2006, pp. 26-31.

* cited by examiner

| SESSION NO. | FIRST USER DEVICE | SECOND USER DEVICE | PINHOLES |
|---|---|---|---|
| S1 | USER DEVICE 102 | USER DEVICE 104 | 116, 118 |
| S2 | | | |

SESSION TABLE 524

FIG. 6

SYSTEMS AND METHODS FOR IMPLEMENTING A PROTOCOL-AWARE NETWORK FIREWALL

RELATED APPLICATIONS

This application is a continuation of application Ser. No. 11/557,703, filed Nov. 8, 2006, which claims the benefit of provisional U.S. Patent Application No. 60/734,318, filed Nov. 8, 2005, both of which are incorporated by reference herein.

BACKGROUND INFORMATION

The Internet Protocol (IP) may be used for transmitting voice over a packet-switched network, which may be called "voice over IP" or "VoIP." Networks implementing VoIP may use network perimeter protection, such as firewalls, that block unwanted and/or potentially malicious traffic from infiltrating the network.

BRIEF DESCRIPTION OF THE DRAWINGS

FIG. 6 is an exemplary session table that may be used in embodiments described herein;

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Figure 1:
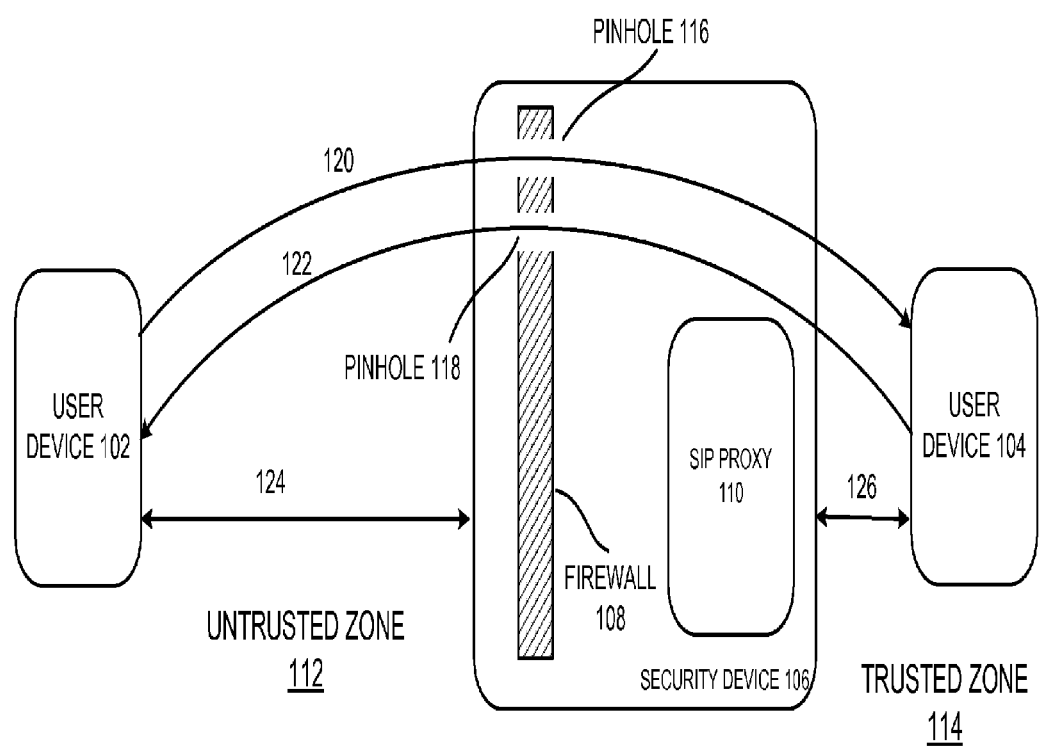
FIG. 1 is a block diagram of an exemplary environment including a security device.

FIG. 1 is a block diagram of an exemplary environment 100 including security device 106. FIG. 1 includes user device 102, user device 104, and security device 106. User devices 102 and 104 may include telephones, computers, portable digital assistants, or any other communication devices. Security device 106 may include firewall 108 and SIP proxy 110. Security device 106 may divide exemplary environment 100 into untrusted zone 112 (including user device 102) and trusted zone 114 (including user device 104). Untrusted zone 112 may include, for example, the Internet. Trusted zone 114 may include, for example, a telephone company's private network. In this example, user device 104 may include a customer's computer on the telephone company's private network. Although FIG. 1 shows SIP proxy 110 located toward the trusted zone 114, in another embodiment SIP proxy 110 may also be located on the other side of firewall 108, specifically toward untrusted zone 112, for example.

Firewall 108 may prevent devices in untrusted zone 112 from accessing devices in trusted zone 114. To do this, in exemplary environment 100, packets may not enter or leave trusted zone 114 without passing through firewall 108. Firewall 108 may enforce access control policies that define which packets may pass through firewall 108—in one or both directions. For example, firewall 108 may compare a received packet to a criterion or criteria to determine whether the packet should be forwarded to its destination or dropped. This comparison may also be called "packet filtering." Comparisons to criteria, for example, may include comparing a received packet's source and destination IP address, source and destination port number, and/or protocol type to a table of allowed source and destination IP addresses, source and destination port numbers, and/or protocol type. By doing this comparison, firewall 108 may help protect trusted zone 114 from malicious traffic sent from untrusted zone 112.

User devices 102 and 104 may include, for example, telephones that transmit and receive voice data. In this example, the traversal of data from user device 102 through one or more networks to user device 104 may be represented as line 120 ("media stream 120"). The traversal of data from user device 104 through one or more networks to user device 102 may be represented as line 122 ("media stream 122"). When a packet passes through firewall 108, it may be said to have passed through a "pinhole" in firewall 108. For example, as illustrated in FIG. 1, media stream 122 may pass through pinhole 118 and media stream 120 may pass through pinhole 116.

Before user devices 102 and 104 may exchange media streams 120 and 122, e.g., establish a telephone call, user devices 102 and 104 may have to agree on parameters for doing so. For example, user device 102 may have to send the port number on which it intends to receive media stream 122. Likewise, user device 104 may have to send the port number on which it intends to receive media stream 120. Such signaling may be performed by the Session Initiation Protocol (SIP), an application-layer control protocol that may establish port numbers for sessions. SIP may not transport media steams 120 or 122, but may allow user devices 102 and 104 to agree on parameters for doing so. A session may include a lasting connection between two user devices, for example. Sessions may include telephone calls, multimedia distribution, or multimedia conferences. In FIG. 1, SIP signaling may be represented by signal 124 between user device 102 and security device 106 and signal 126 between security device 106 and user device 104. SIP proxy 110 may reside between user devices 102 and 104 to assist in the exchange of SIP signals.

Figure 2:
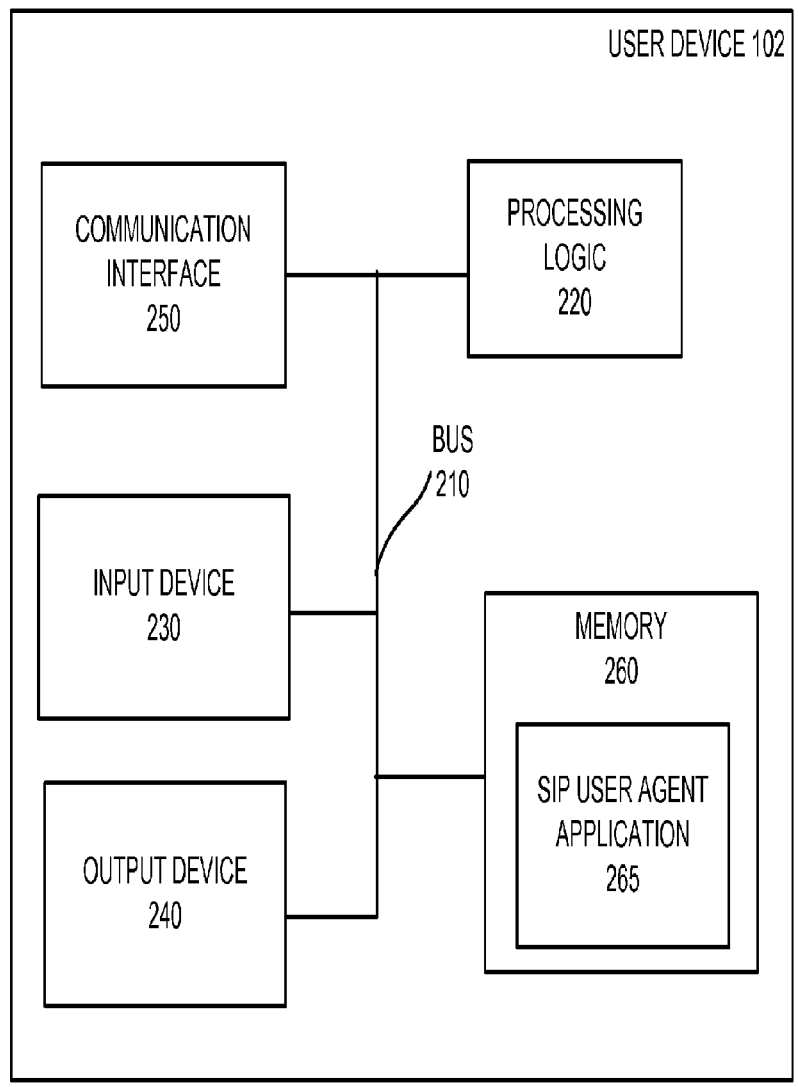
FIG. 2 is a block diagram of exemplary components of the user device of FIG. 1.

FIG. 2 is a block diagram of exemplary components of user device 102. User device 104 may be similarly configured. User device 102 may include a bus 210, processing logic 220, an input device 230, an output device 240, a communication interface 250, and a memory 260. Memory 260 may include a SIP user agent application program 265. User device 102 may include other components (not shown) that aid in receiving, transmitting, and/or processing data. Moreover, other configurations of components in user device 102 are possible.

Bus 210 may permit communication among the components of user device 102. Processing logic 220 may include any type of processor or microprocessor that interprets and executes instructions. In other embodiments, processing logic 220 may include an application specific integrated circuit (ASIC), field programmable gate array (FPGA), or the like.

Input device 230 may include a device that permits a user to input information into user device 102, such as a keyboard, a keypad, a mouse, a pen, a microphone, one or more biometric mechanisms, and the like. Output device 240 may include a device that outputs information to the user, such as a display, a printer, a speaker, etc.

Communication interface 250 may include any transceiver-like mechanism that enables user device 102 to communicate with other devices and/or systems. For example, communication interface 250 may include mechanisms for communicating with user device 104 via one or more networks.

Memory 260 may include a random access memory (RAM) or another type of dynamic storage device that stores information and instructions for execution by processing logic 220, a read only memory (ROM) or another type of static storage device that stores static information and instructions for processing logic 220, and/or some other type of magnetic or optical recording medium and its corresponding drive for storing information and/or instructions.

Memory 260 may store user agent 265. User agent 265 may include instructions for causing user device 102 to implement SIP signaling on behalf of user device 102. In doing so, User agent 265 may include instructions to cause user device 102 to assign a port number for a session, such as a call between user devices 102 and 104. User agent 265 may include instructions for causing user device 102 to assign port numbers dynamically, that is, port numbers may be different for each session between user device 102 and user device 104. User agent 265 may create, modify, or terminate sessions with participants of the session, such as user device 104.

User device 102 may allow a user to establish a session, e.g., a call, with another user device, such as user device 104. User device 102 may perform these and other acts in response to processing logic 220 executing software instructions contained in a computer-readable medium. A computer-readable medium may be defined as one or more tangible memory devices and/or carrier waves. The software instructions may be read into memory 260 from another computer-readable medium or from another device via communication interface 250. Alternatively, hardwired circuitry may be used in place of or in combination with software instructions to implement processes consistent with the principles of the invention. Thus, embodiments are not limited to any specific combination of hardware circuitry and software.

Figure 3:
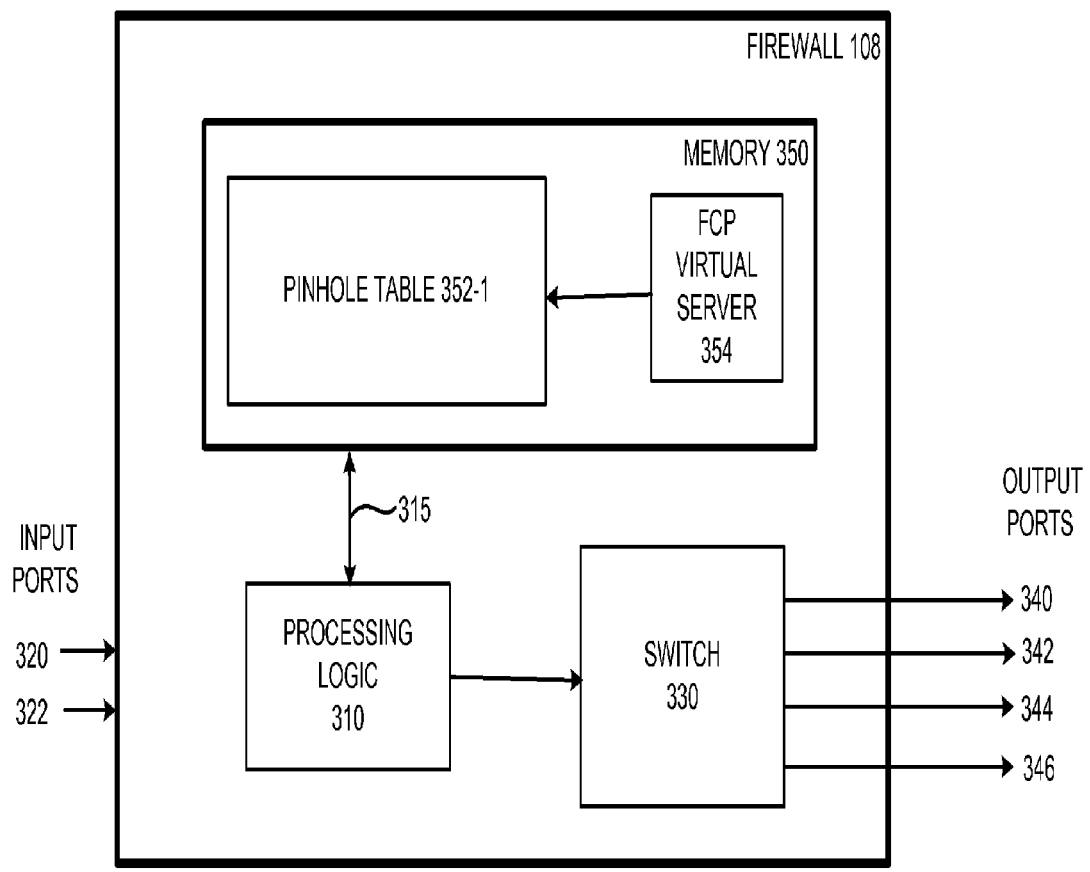
FIG. 3 is a block diagram of exemplary components of a firewall.

FIG. 3 is a block diagram of exemplary components of firewall 108. Firewall 108 may include processing logic 310, input ports 320 and 322, a switch 330, output ports 340-346, and a memory 350. Memory 350 may include a pinhole table 352-1 and a Firewall Control Protocol (FCP) virtual server 354. Firewall 108 may include other components (not shown) that aid in receiving, transmitting, and/or processing data. Moreover, other configurations of components in firewall 108 are possible.

Processing logic 310 may include any type of processor or microprocessor that interprets and executes instructions. In other embodiments, processing logic 310 may include an application specific integrated circuit (ASIC), field programmable gate array (FPGA), or the like. In one embodiment, processing logic 310 may include one or more processors and/or microprocessors. In one embodiment, processing logic 310 may include one or more general processors and one or more processors dedicated to searching pinhole table 352-1.

Input ports 320 and 322 may receive packets that may be processed by firewall 108, such as by processing logic 310. Switch 330 may receive packets and forward the packets to an appropriate output port, such as one of output ports 340-346. Switch 330 is shown with one input and four outputs, but more or fewer inputs and outputs are possible. Other network devices other than switch 330 are possible to perform a logical switching function, such as a hub or a router. Output ports 340-346 output packets from firewall 108 to their destinations.

Memory 350 may include a RAM or another type of dynamic storage device that stores information and instructions for execution by processing logic 310, a ROM or another type of static storage device that stores static information and instructions for processing logic 310, and/or some other type of magnetic or optical recording medium and its corresponding drive for storing information and/or instructions.

Pinhole table 352-1 may store current pinholes in firewall 108. In one embodiment, pinhole table 352-1 may be implemented in a content-addressable memory (CAM). Pinhole table 352-1 may include a static table (not shown) and a dynamic table (not shown). The dynamic table may include pinhole entries that can be added or removed, such as pinholes 116 and 118 for media signals 120 and 122. The static table may include pinhole entries that do not change, such as pinholes for SIP signaling. Virtual server 354 may include instructions that cause entries to be created in and/or removed from pinhole table 352-1. In one embodiment, virtual server 354 may receive instructions from SIP proxy 110 to create or remove entries from pinhole table 352-1.

Figure 4:
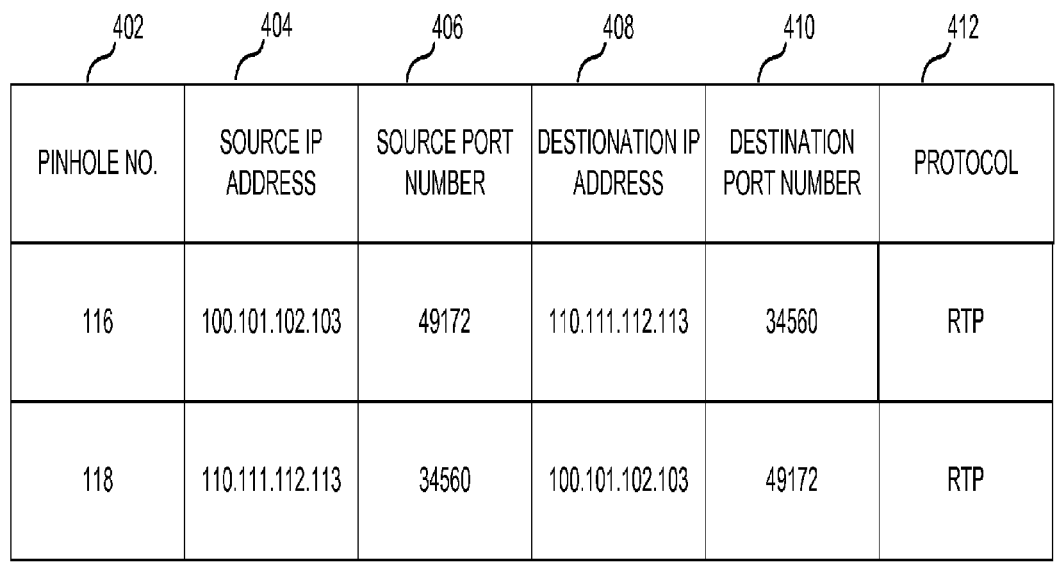
FIG. 4 is an exemplary pinhole table that may be used in an embodiment described herein.

FIG. 4 is an exemplary pinhole table 352-1 that may be used in an embodiment described herein. As mentioned above, pinhole table 352-1 may store current pinholes in firewall 108. Each entry, e.g., row in pinhole table 352-1 may correspond to a different media stream through firewall 108, for example. As illustrated, pinhole table 352-1 may include a pinhole number field 402, a source IP address field 404, a source port field 406, a destination IP address field 408, a destination port field 410, and a protocol field 412. Pinhole table 352-1 may include additional or fewer fields than illustrated in FIG. 4. For example, pinhole table 352-1 may include a field for packet length. As another example, pinhole table 352-1 may exclude the source IP address field 404 or source port number field 406. Further, pinhole table 352-1 may exclude the pinhole number field 402.

Pinhole number field 402 may include a number identifying the pinhole. In one embodiment, pinhole number field 402 may uniquely identify the pinhole. Source IP address field 404 and source port number field 406 may identify the source IP address and port number, respectively, associated with a user device, such as user device 102, that initiated the creation of the pinhole identified in pinhole number field 402. Destination IP address field 408 and destination port number field 410 may identify the destination IP address and port number, respectively, associated with a user device, such as user device 104, that is the destination of packets traversing the pinhole identified in pinhole number field 402. Protocol field 412 may identify a protocol type of a packet that may pass through firewall 108. Examples of protocol types include the Real-Time Protocol (RTP), the Real-Time Control Protocol (RTCP), or File Transfer Protocol (FTP).

The following description relates to the example of pinhole table 352-1 in FIG. 4. Pinhole table 352-1 may store information related to pinholes 116 and 118 that allow media streams 120 and 122 to pass through firewall 108 between user devices 102 and 104, as illustrated in FIG. 1. In this example, user device 102 may have an IP address of 100.101.102.103 and a port number of 49172; user device 104 may have an IP address of 110.111.112.113 and a port number of 34560. A packet in media stream 120, therefore, may have a source IP address of 100.101.102.103, a source port of 49172, a destination IP address of 110.111.112.113, a destination port of 34560, and a protocol of RTP. Thus, the pinhole entry corresponding to pinhole 116, which may allow media stream 120 to pass through firewall 108, may similarly indicate a source IP address of 100.101.102.103, a source port number of 49172, a destination IP address of 110.111.112.113, a destination port number of 34560, and a protocol of RTP, as shown in FIG. 4.

Figure 5:
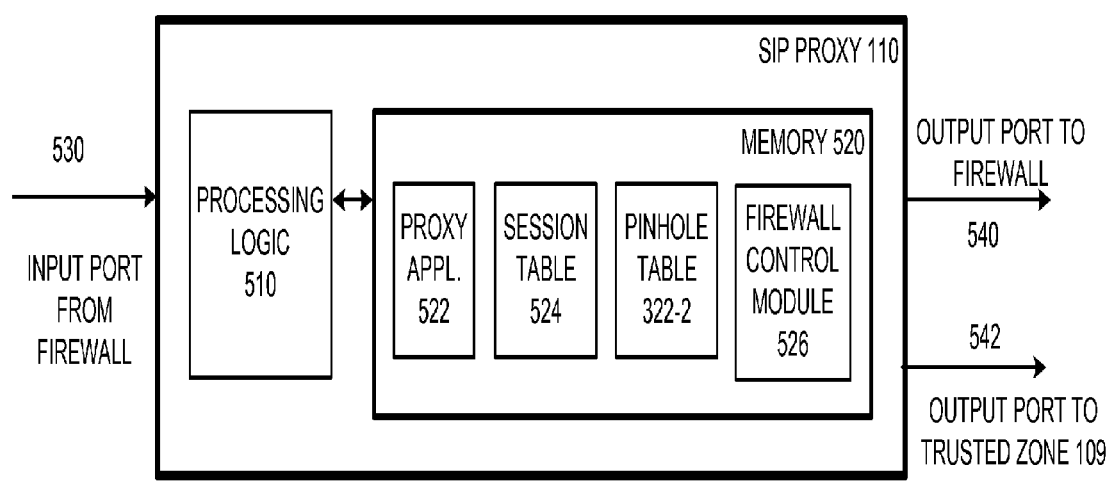
FIG. 5 is a block diagram of exemplary components of a SIP proxy.

FIG. 5 is a block diagram of exemplary components of SIP proxy 110. SIP proxy 110 may include processing logic 510, a memory 520, an input port 530 from firewall 108, an output port 540 to firewall 108, and an output port 542 to trusted zone 114. Memory 520 may include a SIP proxy application 522, a session table 524, a pinhole table 352-2, and a firewall control module 526 (FCM 526). SIP proxy 110 may include other components (not shown) that aid in receiving, transmitting, and/or processing data. Moreover, other configurations of components in SIP proxy 110 are possible.

Processing logic 510 may include any type of processor or microprocessor that interprets and executes instructions. In other embodiments, processing logic 510 may include an ASIC, a FPGA, or the like.

Memory 520 may include a RAM or another type of dynamic storage device that stores information and instructions for execution by processing logic 510, a ROM or another type of static storage device that stores static information and instructions for processing logic 510, and/or some other type of magnetic or optical recording medium and its corresponding drive for storing information and/or instructions.

Proxy application 522 may include instructions to assist user devices to exchange SIP signals to establish sessions. Proxy application 522 may include instructions to implement a full SIP stack and may support multiple transport protocols (e.g., TLS, TCP and UDP). Proxy application 522 may also include instructions to provide a redirecting, forking proxy and registration server that provides name mapping (such as domain name resolution), user location and scripting services.

Pinhole table 352-2 may have similar entries to pinhole table 352-1 and may describe the current pinholes in firewall 108. Session table 524 may include entries, e.g., rows, for active sessions between user agents. FCM 526 may include instructions to maintain pinhole table 352-2 and session table 524. FCM 526 may also include instructions to send Firewall Control Protocol (FCP) messages to firewall 108 to open or close pinholes in firewall 108 (e.g., by creating or removing entries in pinhole table 352-1).

Input port 530 may allow for SIP proxy 110 to receive packets, such as SIP packets, from firewall 108. Although one input port is shown, in another embodiment, more than one input port may be provided. Output port 540 may allow SIP proxy 110 to send packets, such as FCP packets, to firewall 108. Output port 542 may allow SIP proxy 110 to send SIP signaling packets to user devices in trusted zone 109, for example. Although two output ports are shown in FIG. 5, in another embodiment, more or fewer input ports may be provided.

FIG. 6 is an exemplary session table 524 that may be used in embodiments described herein. As mentioned, session table 524 may include entries, e.g., rows, for active sessions between user agents. As illustrated, session table 524 may include a session number field 602, a first user device field 604, a second user device field 606, and pinholes field 608. Session table 524 may include additional or fewer fields than illustrated in FIG. 6. For example, session table 524 may include a field for the IP addresses of user agents. As another example, session table 524 may exclude the session number field 602. Further, session table 524 may include fields to identify user agents.

Session number field 602 may store a unique number that may identify each session. First and second user device fields 604 and 606 may identify the user devices that are party to the session identified in session number field 602. Pinholes field 608 may identify one or more pinholes, e.g., connections, associated with the session identified in session number field 602. For example, session S1 in session table 524 indicates two pinholes associated with that session, namely, pinholes 116 and 118. In another embodiment, session S1 may indicate four pinholes associated with that session: two pinholes for real-time media (such as pinholes 116 and 118), and two additional pinholes for the accompanying Real Time Control Protocol (RTCP) signaling.

In the example illustrated in FIG. 6, session table 524 stores the session between user devices 102 and 104 that are illustrated in FIG. 1. That session illustrated in FIG. 1 includes pinholes 116 and 118. Pinholes 116 and 118 allow media streams 120 and 122 to pass through firewall 108 for a voice conversation, for example.

Figure 7:
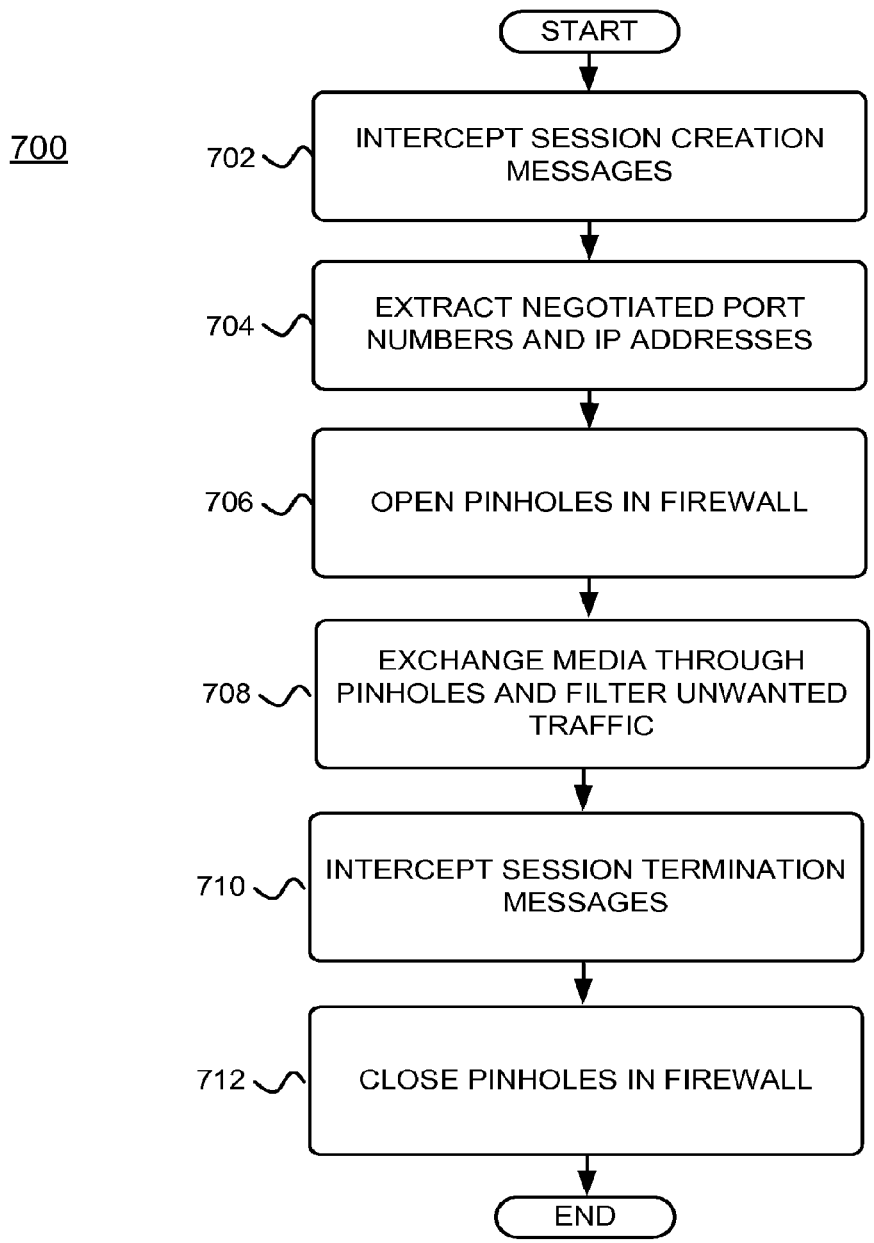
FIG. 7 is a flow chart of an exemplary process for establishing a session between user agents in an exemplary environment with a firewall.
Figure 8:
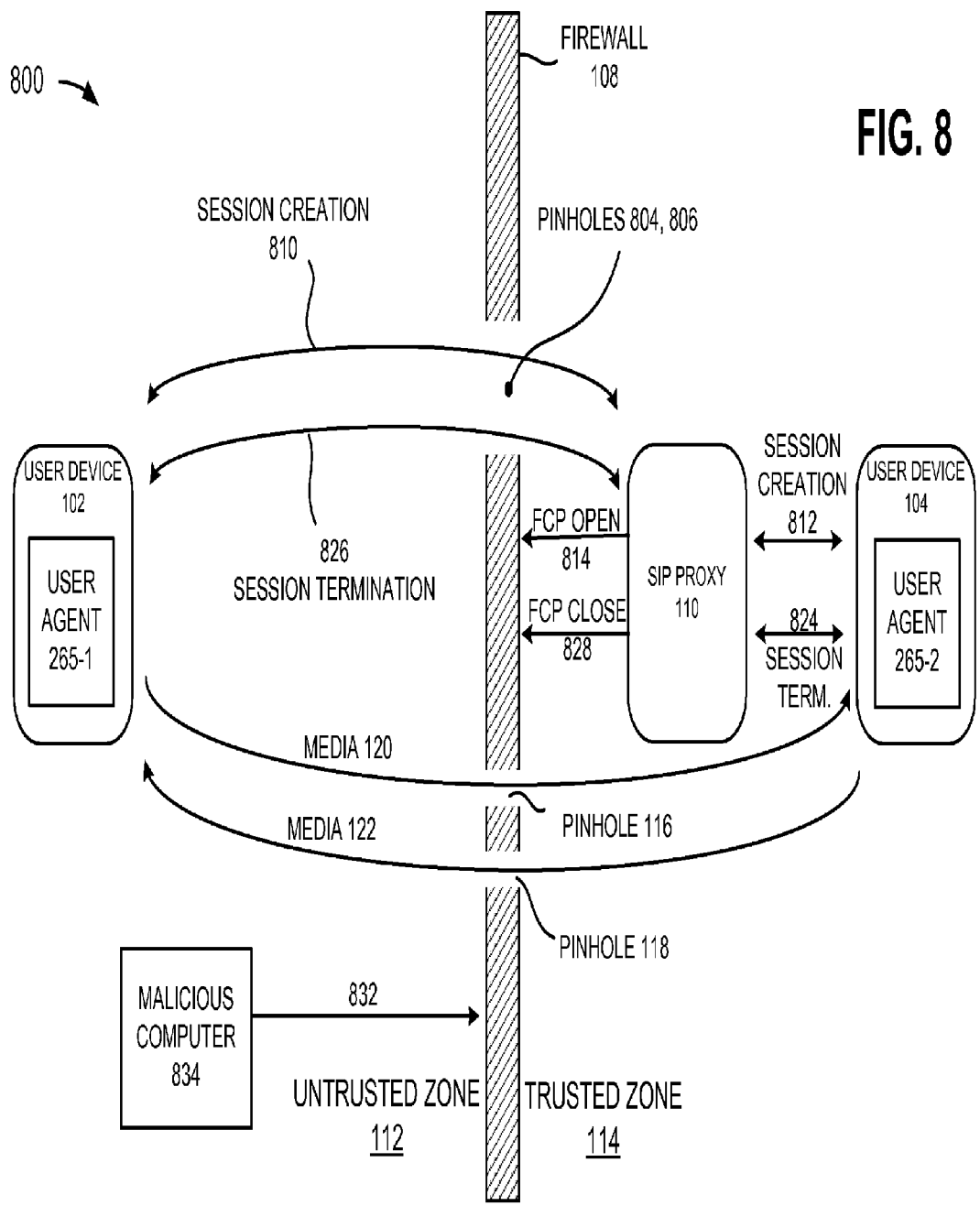
FIG. 8 is a block diagram of an exemplary environment including a firewall.

FIG. 7 is a flow chart of an exemplary process 700 for establishing a session between user agents. FIG. 7 is described in relation to the exemplary environment 800 shown in FIG. 8. Like FIG. 1, FIG. 8 includes user device 102, user device 104, firewall 108, and SIP proxy 110. FIG. 8 also shows a user agent 265-1 (in memory 260 of user device 102, for example), and a user agent 265-2 (in a memory of user device 104, for example). As shown in FIG. 8, firewall 108 may open pinholes 804 and 806 to pass SIP messages, which may be exchanged on a static port. FIG. 8 also shows numerous signals and a malicious computer 834 that are described below with respect to exemplary process 700.

As shown in FIG. 7, session creation messages may be intercepted (block 702). In the exemplary embodiment of FIG. 8, SIP proxy 110 may intercept, e.g., receive, session creation messages by routing session creation messages 810 and 812 to and from user agents 265-1 and 265-2. Session creation messages 810 and/or 812 may include the IP address of the user device associated with user agent 265-1 (i.e., user device 102) and an associated port number for a session. Further, session creation messages 810 and/or 812 may include the IP address of user agent 265-2 and an associated port number for a session. The port numbers and IP addresses may be extracted (block 704). In the exemplary environment of FIG. 8, SIP proxy 110 may extract the IP addresses of user agents 265-1 and 265-2 and the associated port numbers from session creation messages 810 and/or 812 for a session. One or more pinholes may be opened in firewall 108 (block 706). In the exemplary embodiment of FIG. 8, SIP proxy 110 may instruct the opening of pinholes 116 and 118 by sending OPEN pinhole message 814 to firewall 108. Firewall 108 may receive the OPEN pinhole message 814 and firewall 108 may open pinholes 116 and 118 by, for example, storing the appropriate information into pinhole table 352-1.

Media streams may be exchanged through the opened pinholes and unwanted traffic may be blocked (block 708). In the exemplary embodiment of FIG. 8, media streams 120 and 122 may be exchanged between user devices 102 and 104 through pinholes 116 and/or 118. As shown, user devices 102 and 104 may exchange media 120 and 122 without media streams 120 and 122 passing through SIP proxy 110. Further, firewall 108 may block unwanted traffic 832 from malicious computer 834.

Session termination messages may be intercepted (block 710). In the exemplary embodiment of FIG. 3, SIP proxy 110 may intercept, e.g., receive, session termination messages 824 and 826 to and from user agents 265-1 and 265-2. One or more pinholes may be closed (block 712). In the exemplary embodiment of FIG. 8, SIP proxy 110 may instruct the closure of pinholes 116 and 118 by sending CLOSE message 828 to firewall 108. Firewall 108 may then close pinholes 116 and 118 by, for example, removing the appropriate entries from pinhole table 352-1.

Although FIG. 7 shows an order of a number of blocks in process 700, process 700 may include more or fewer blocks. Further, process 700 does not have to perform the blocks shown in FIG. 7 in any particular order.

Figure 9:
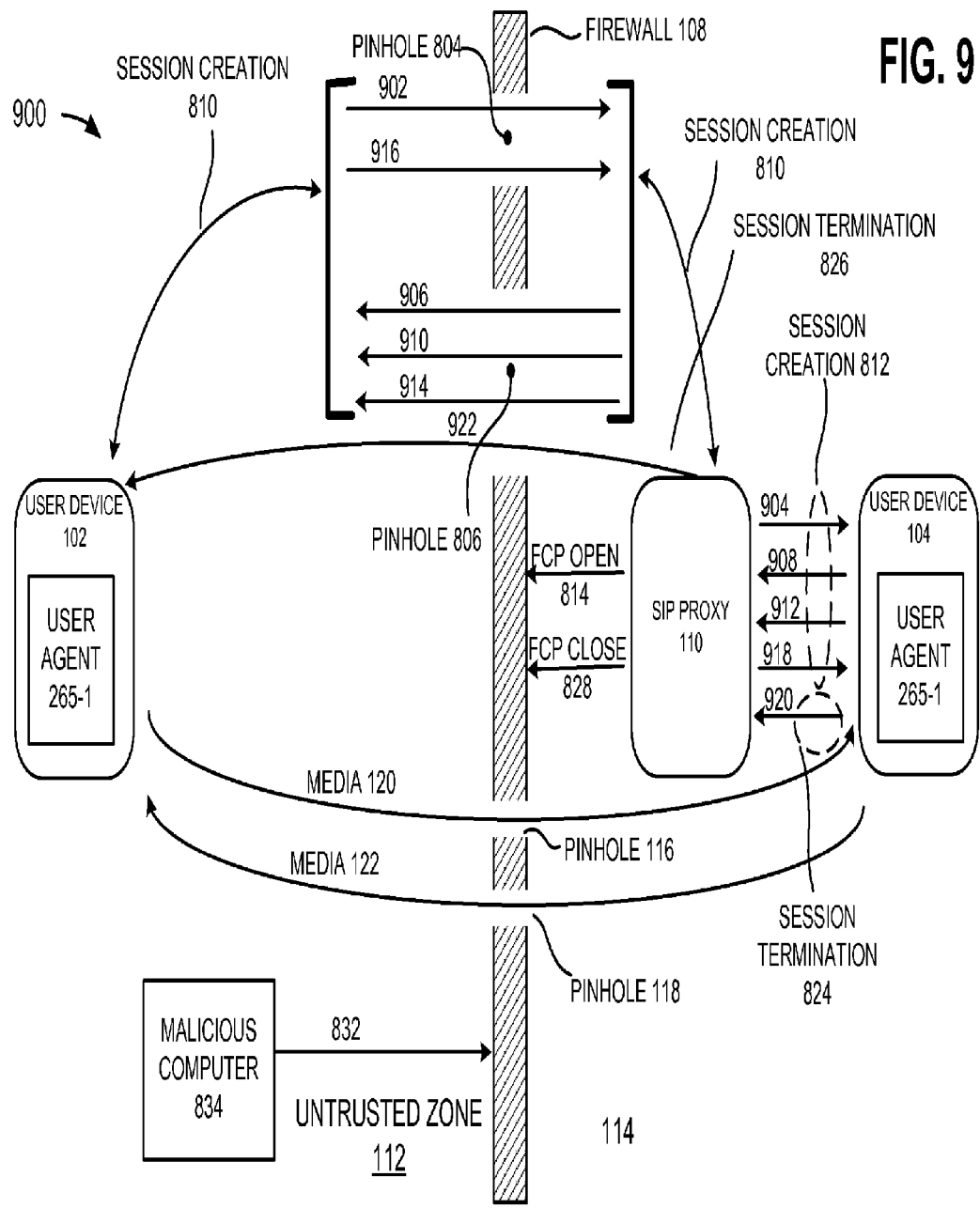
FIG. 9 is a more detailed block diagram of the exemplary environment of FIG. 8 including a firewall.

FIG. 9 is a block diagram of exemplary environment 900 including firewall 108. FIG. 9 is similar to FIG. 8, except FIG. 9 also shows the individual messages that may form session creation messages 810 and 812 and session termination messages 824 and 826. In FIG. 9, session creation messages 810 may include INVITE message 902, TRYING message 906, RINGING message 910, OK message 914, and ACK message 916. Also in FIG. 9, session creation messages 812 may include INVITE message 904, RINGING message 908, OK message 912, and ACK message 918. Session termination messages 824 may include BYE message 920 and session termination messages 826 may include BYE message 922.

Session creation messages 810 and 812 may be implemented as follows. In FIG. 9, INVITE message 902 may be sent from user agent 265-1 toward user agent 265-2. SIP proxy 110 may intercept INVITE message 902 and may forward INVITE message 904 to user agent 265-2. INVITE message 902 may include the IP address of user device 102 and the port number that user agent 265-1 may use to receive media from user agent 265-2. SIP proxy 110 may inspect INVITE message 904 to become aware of the IP address of user device 102 and the port number that user agent 265-1 will use to receive media from user agent 265-2.

SIP proxy 110 may send TRYING message 906 in response to INVITE message 902. RINGING message 908 may be sent from user agent 265-2 toward user agent 265-1 in response to INVITE message 904. SIP proxy 110 may intercept RINGING message 908 and forward RINGING message 910 to user agent 265-1. SIP proxy may inspect RINGING message 908. OK message 912, indicating that user agent 265-2 accepts the session invitation, may be sent from user agent 265-2 toward user agent 265-1. SIP proxy 110 may intercept OK message 912 and forward OK message 914 to user agent 265-1. OK message 912 may include the IP address of user device 104 and the port number that user device 104 may receive media from user device 102. SIP proxy 110 may inspect OK message 912 to become aware of the IP address of user device 104 and the port number that user device 104 may use to receive media from user device 102.

Because SIP proxy 110 may be aware of the IP addresses and associated ports, SIP proxy 110 may send OPEN pinhole message 814 to firewall 108 to open one or more pinholes 116 and/or 118. OPEN pinhole message 814 may be part of a Firewall Control Protocol (FCP). User agent 265-1 may acknowledge receipt of the OK message 914 by sending ACK message 916 from user agent 265-1 toward user agent 265-2. SIP proxy 110 may intercept ACK message 916 and may forward ACK message 918 to user agent 265-2. SIP proxy 110 may inspect ACK message 916. Media stream 120 and media stream 122 may be sent and received between user devices 102 and 104 and unwanted traffic 832 may be blocked.

In the example of FIG. 9, user agent 265-2 may end the session with user agent 265-1. User agent 265-2 may send BYE message 922 toward user agent 265-1. SIP proxy 110 may intercept BYE message 920 and may forward BYE message 922 to user agent 265-1. SIP proxy 110 may inspect BYE message 922. SIP proxy, aware that the session between user agents 265-1 and 265-2 is ending, may send CLOSE pinhole message 828 to firewall 108 and pinholes 116 and 118 may be closed in firewall 108. Either user agent 265-1 or user agent 265-2 may choose to end a session by sending a BYE message. CLOSE pinhole message 828 may form part of the FCP messages.

As shown above in FIGS. 8 and 9, SIP proxy 110 and firewall 108 may be configured to send messages, e.g., communicate, with each other. For example, SIP proxy 110 may send OPEN pinhole message 814 and CLOSE pinhole message 828 to firewall 108. Further, firewall 108 may send session creation messages 810 and session termination messages 826 to SIP proxy 110. In one exemplary embodiment, output port 540 of SIP proxy 110 may be connected to input port 320 of firewall 108. Further, output port 340 of firewall 108 may be connected to input port 530 of SIP proxy 110. In this exemplary embodiment, input port 320 of firewall 108 may be used exclusively for receiving traffic from SIP proxy 110. Further, in this exemplary embodiment, output port 340 may be used exclusively for sending traffic from firewall 108 to SIP proxy 110. In another embodiment, input port 320 may not be used exclusively for receiving traffic from SIP proxy 110, but may be shared with input traffic from trusted zone 114 or untrusted zone 112, for example. In yet another embodiment, output port 340 may not be used exclusively for sending traffic to SIP proxy 110 and may send traffic to trusted zone 114 or untrusted zone 112.

Figure 10:
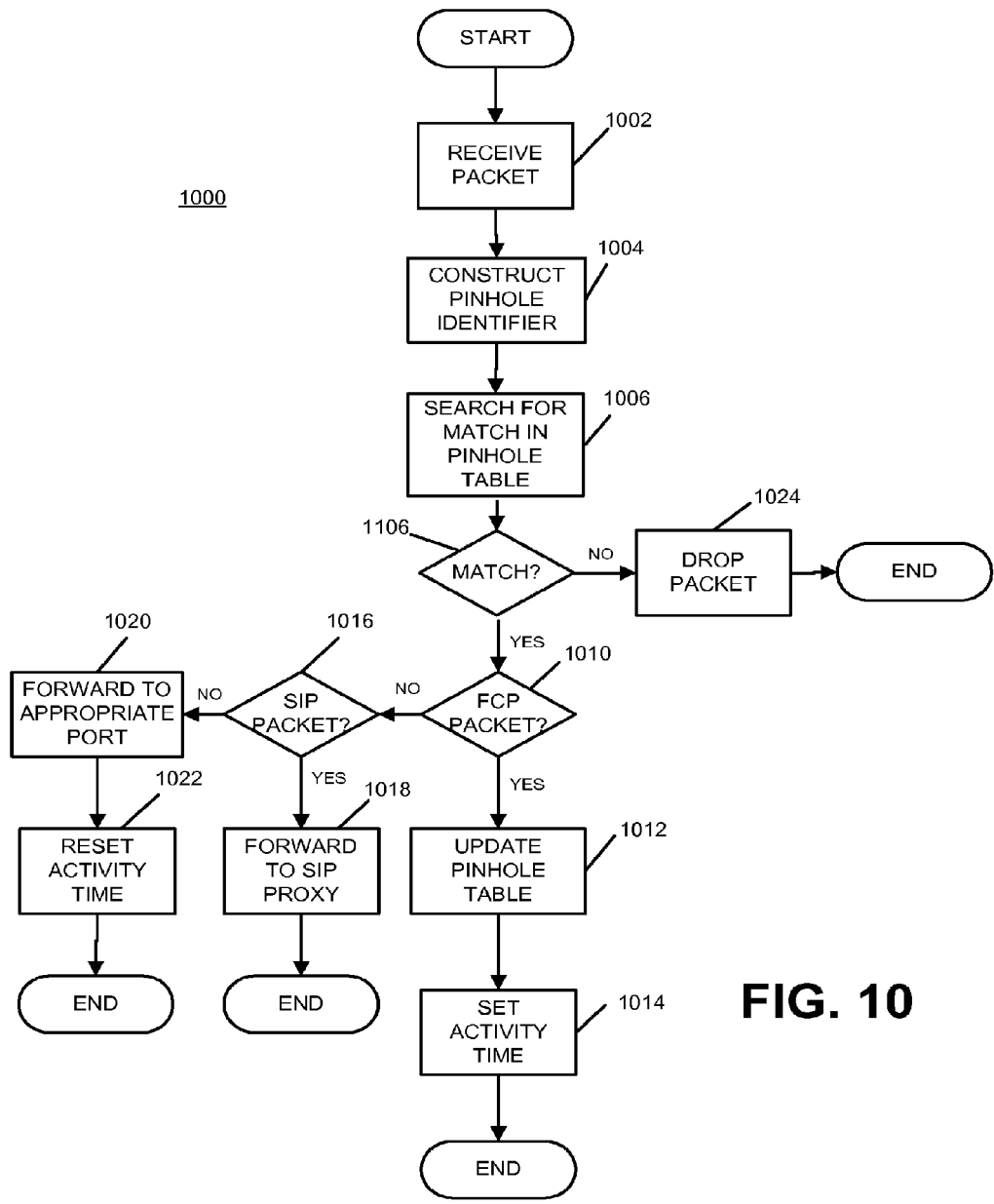
FIG. 10 is a flow chart of an exemplary process for implementing a firewall.

FIG. 10 is a flow chart of an exemplary process 1000 for implementing firewall 108. A packet may be received (block 1002). As shown in FIG. 3, firewall 108 may receive packets on input ports 320 or 322. For example, INVITE message 902 and media streams 120 and/or 122 may arrive on input port 322.

A pinhole identifier may be constructed for the received packet (block 1004). Processing logic 310 may construct the pinhole identifier from the received packet, for example. The packet identifier may be information about the received packet that firewall 108 may use to compare against a criterion or criteria to determine whether the received packet may be forwarded or dropped. The packet identifier may include a five-tuple combination, e.g., five pieces of information, including the source and destination IP addresses, the source and destination port numbers, and the protocol. In another embodiment, the packet identifier may include more than five or less than five pieces of information. For example, the packet identifier may include only the destination IP address and port number.

Pinhole table 352-1 may be searched for a match (block 1006) to the packet identifier. Referring to the exemplary embodiment of FIG. 3, processing logic 310 may search the static table for a match to the packet identifier. Processing logic 310 may also the search dynamic table for a match to the packet identifier. In one embodiment, the dynamic table may only be searched if there is no match in the static table. As mentioned above, in one exemplary embodiment pinhole table 352-1 may be a CAM. In this exemplary embodiment, processing logic 310 may provide the packet identifier, which may be a string of bits corresponding to the five-tuple bit pattern, to the CAM. The CAM may then search its memory for a match and return one or more addresses where the string of bits, e.g., packet identifier, is found, if any. This processing by the CAM may be performed in hardware to increase speed as CAM table lookups may be performed in one CPU cycle.

If a match is found (block 1008—YES) and the packet is an FCP packet (block 1010), then pinhole table 352-1 may be updated (block 1010). Referring to FIG. 3, if the packet is an FCP packet, then processing logic 310 may forward the FCP packet to virtual server 354. If the FCP packet is an OPEN pinhole message, then virtual server 354 may instruct the addition of an entry to pinhole table 352-1. If the FCP packet is a CLOSE pinhole message, then virtual server 354 may instruct the removal an entry from pinhole table 352-1. Adding and/or removing entries from pinhole table 352-1 may include extracting pinhole identifiers from the FCP packet and writing them to or deleting them from pinhole table 352-1. An FCP packet may be processed like any other incoming packet into firewall 108. Firewall 108 may identify FCP packets by the IP address and port on which the FCP packets arrive, for example. In one embodiment, where FCP packets arrive on a dedicated input port, such as input port 320, processing logic 310 may not have to search pinhole table 352-1 before forwarding the FCP packet to virtual server 354.

If a match is found (block 1008—YES) and the packet is an FCP packet (block 1010—YES), then pinhole table 352-1 may be updated and an activity time may be set (blocks 1012 and 1014). If virtual server 354 instructs the addition of an entry to pinhole table 352-1, for example, processing logic 310 may record the time the entry was added to pinhole table 352-1, e.g., the activity time. The activity time for the pinhole entry may be updated when the corresponding pinhole receives traffic, for example, as described below for block 1022. An entry in pinhole table 352-1 may be removed when, for example, the corresponding pinhole has been idle for a particular length of time, such as 100 minutes. The length of time a pinhole has been idle, for example, may be determined by subtracting a pinhole's activity time from the current time. This procedure may prevent pinholes from being left open in case of a signaling fault between SIP proxy 110 and firewall 108, for example. Firewall 108 and processing logic 310 may be aware of the current time by using a clock, for example.

If the packet is an FCP packet, then, in one embodiment, the FCP packet may arrive on a general traffic port, such as input port 322. This embodiment may present a security issue because virtual server 354 may be accessible from untrusted zone 112. To help alleviate this security issue, in another embodiment, one input port, such as input port 320, may be reserved for FCP messages from SIP proxy 110. In another embodiment, an Access Control List (ACL) specifying SIP proxy 110 may be implemented to prevent virtual server 354 from being accessible from untrusted zone 112. In another embodiment, cryptography based authentication mechanisms may be implement to prevent a malicious user from accessing virtual server 354.

If a match is found (block 1008—YES) and the packet is a SIP packet (block 1016—YES), then the packet may be forwarded to SIP proxy 110 (block 1018). If processing logic 310 determines that the received packet is a SIP message, for example, then switch 330 may output the packet on output port 340 to SIP proxy 110. For example, referring to FIG. 9, INVITE message 902 and ACK message 916 may be forwarded from firewall 108 to SIP proxy 110 through output port 340.

If there is a match (block 1008—YES) and the packet is not an FCP packet (block 1010—NO) or a SIP packet (block 1016—NO), then the packet may be forwarded to the appropriate port (block 1020). Referring to FIG. 8, packets in media streams 120 and 122 are examples of packets in which their packet identifiers would match an entry in pinhole table 352-1, but are not FCP packets or SIP packets. As such, packets in media streams 120 and 122 may be passed through firewall 108.

If there is a match (block 1008—YES) and the packet is not an FCP packet (block 1010—NO) or a SIP packet (block 1016—NO), then the activity time associated with the pinhole may be reset (block 1022). In other words, when traffic passes through a pinhole, the activity time may be reset so that processor 310 may know that the pinhole is active and not idle. Other activities may also reset the activity time, such as any traffic through any pinhole associated with a session, for example.

If there is no match in the pinhole table 352-1 (block 1008—NO), then the packet may be dropped (block 1024). For example, referring to FIG. 8, traffic 832 from malicious computer 834 would be dropped by firewall 108. Pinhole table 352-1 may represent the access control policies enforced by firewall 108. In other words, pinhole table 352-1 may represent the criteria that firewall 108 uses to compare a received packet in order to determine whether the packet should be forwarded to its destination or dropped. Pinhole table 352-1 may be traversed for arriving packets to determine whether the packet should be forwarded or dropped. In one embodiment, pinhole table 352-1 may not be traversed for each packet arriving at firewall 108.

Although FIG. 10 shows an order of a number of blocks in process 1000, process 1000 may include more or fewer blocks. Further, process 1000 does not have to perform the blocks shown in FIG. 10 in any particular order. For example, process 1000 may perform block 1010 before or after block 1016.

The following discussion provides an example of parts of process 1000. Regarding FIG. 1, user device 102 may have an IP address of 100.101.102.103 and may receive media stream 122 from user device 104 on port number 49172 using RTP. User device 104 may have a destination IP address of 106.111.112.113 and may receive media stream 120 from user device 102 on port number 34540 using RTP. In this example, a media packet from user device 102 to user device 104 in media stream 120 may have the following five-tuple packet identifier: 100.101.102.103/49172; 106.111.112.113/34540; RTP. This packet identifier would match the pinhole number 116 in pinhole table 352-1, for example. As a result, such a packet may pass through firewall 108. In this example, a media packet from user device 104 to user device 102 in media stream 122 may the following five-tuple packet identifier: 106.111.112.113/34540; 100.101.102.103/49172; RTP. This packet identifier may match the pinhole number 118 in pinhole table 352-1, for example. As a result, such a packet may pass through firewall 108.

Figure 11:
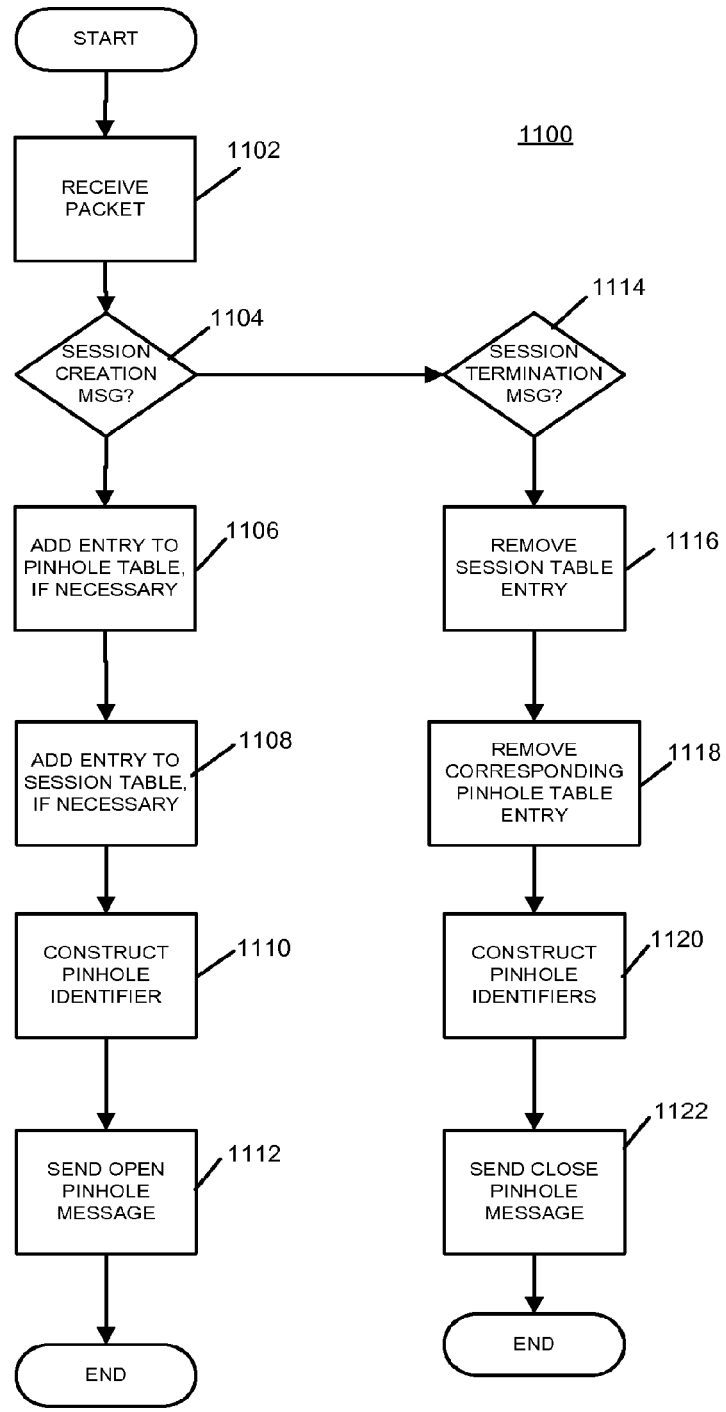
FIG. 11 is a flow chart of an exemplary process for implementing a SIP proxy.

FIG. 11 is a flow chart of an exemplary process 1100 for implementing SIP proxy 110. A packet may be received (block 1102). In FIG. 5, a packet may be received on input port 530. If the received packet is a session creation message (block 1104), then an entry may be added to pinhole table 352-2, if necessary (e.g., if an entry does not already exist for the session in pinhole table 352-2) (block 1106). In FIG. 5, FCM 526 may instruct the extraction of the IP addresses and port numbers from the session creation message and may instruct the addition of an entry to pinhole table 352-2, for example. Likewise, if the received packet is a session creation message, an entry may be added to session table 524, if necessary (block 1108). FCM 526 may include instructions to manage session table 524 and pinhole table 352-2. If a new entry is made in pinhole table 352-2, then a pinhole identifier may be constructed (block 1110). FCM 526 may instruct the construction of the pinhole identifier. The pinhole identifier may include the five-tuple combination of the source and destination IP addresses, the source and destination port numbers, and the protocol of the negotiated media stream, for example. An OPEN pinhole message may be sent to firewall 108 (block 1112). FCM 526 may instruct the sending of OPEN pinhole message 814 to firewall 108. OPEN pinhole message 814 may include the five-tuple combination.

If the received packet is a session termination message (block 1114—YES), then an entry may be removed from session table 524 (block 1116). Likewise, if the received packet is a session termination message, the entries corresponding to that session in pinhole table 352-2 may be removed (block 1118). If entries are removed from pinhole table 352-2, then pinhole identifiers may be constructed (block 1120). The pinhole identifier may include the five-tuple combination of the source and destination IP addresses, the source and destination port numbers, and the protocol of the negotiated media stream, for example. A CLOSE pinhole message may be sent to firewall 108 (block 1122). FCM 526 may instruct the sending of CLOSE message 828 to firewall 108. CLOSE pinhole message 828 may include the five-tuple combination.

Although FIG. 11 shows an order of a number of blocks in process 1100, process 1100 may include more or fewer blocks. Further, process 1100 does not have to perform the blocks shown in FIG. 11 in any particular order. For example, process 1100 may perform block 1104 after block 1114. As another example, process 1100 may perform blocks 1106 and 1108 after blocks 1110 and 1112.

As described, the entries in pinhole table 352-1 may match those in pinhole table 352-2, except for a latency created by the time required for FCP messages traveling from SIP proxy 110 to firewall 108. Further, that pinhole tables 352-1 and 352-2 may not be the same because of signaling errors and/or because of entries being removed from pinhole table 352-1 due to inactivity, for example. FCP messages may be carried by UDP. Using UDP may result in high-rate updates from SIP proxy 110 to firewall 108 in real time.

In one embodiment, SIP proxy 110 may be on a separate host than firewall 108 located in trusted network 114. In another embodiment, SIP proxy 110 includes an array of hosts running in load sharing mode and controlling firewall 108. In one embodiment, more than one SIP proxy 110 may be used to control firewall 108. In this embodiment, the SIP proxies may be in a private subnet, isolated from untrusted zone 112, and connected to a reserved input port, such as input port 320.

In the exemplary embodiment described with FIGS. 3 and 5, SIP proxy 110 and firewall 108 are separate. In other words, SIP signal processing and packet filtering may be performed by separate processors, e.g., processing logic 510 and processing logic 310. In another embodiment, SIP proxy 110 (or some of the functions performed by SIP proxy 110) and media packet filtering may be performed by the same processor.

Firewall 108 and SIP proxy 110 may be implemented in the commercially available CloudShield™ CS2000™ fast packet processing application server. The CloudShield™ CS-2000™ includes (1) a Deep Packet Processing Module (DPPM) and (2) an onboard Pentium-based Linux Application Server Module (ASM).

Firewall 108 may be implemented using the DPPM. The DPPM is based on the Intel IXP 2800 network processor and includes sixteen programmable data plane computers, a silicon database using Content Addressable Memory (CAM) technology. CAM technology may allow fast comparisons of packet identifiers to pinhole identifiers because of its hardware implementation. The DPPM may act as a dynamic packet filter peering at layers three and four of the received packet headers. The DPPM may also act as a dynamic packet filter peering at layer seven of the received packet headers.

Applications for the DPPM may be written in the high-level language called Rapid Application and Visualization Environment (RAVE) and may be converted into DPPM application logic for real-time execution. For example, virtual server 354 may be an application program written in RAVE that resides in the DPPM.

SIP proxy 110 may be implemented using the ASM portion of the CS-2000™. SIP proxy 110 may be implemented using the "SIP-Proxy sipd" ("sipd proxy"). A sipd proxy, for example, may be found in the Columbia InterNet Multimedia Architecture (CINEMA).

Embodiments described herein are not limited to SIP signaling. Other applications, such as File Transfer Protocol (FTP), may dynamically assign port numbers. Thus, embodiments described herein may be used in connection with FTP and other protocols. Further, although embodiments described herein may use SIP, other session signaling protocols may be used, such as H.323. Also, embodiments described herein may use packet switching protocols other than IP, such as ATM.

In one embodiment, implementations described above may be used in conjunction with a SS7-based PSTN network. In such an embodiment, a user device's user agent, for example, may be separated from the user device itself. In other words, even though a SS7-based PSTN phone network may be used, portions of a session may implement a packet-switched network using implementations described above.

Embodiments described herein may provide for a firewall. An embodiment described may provide for a protocol-aware firewall. An embodiment described may provide a SIP-aware firewall. An embodiment described may provide for a firewall that may not be protocol aware. An embodiment described may provide for an application-layer firewall. An application described may provide a firewall to dynamically open and close pinholes. Embodiments described herein may prevent random or malicious unauthorized network traffic from entering a trusted zone, for example, which may help defend against a Denial of Service (DoS) attack.

U.S. patent application Ser. No. 11/557,740, entitled "PREVENTION OF DENIAL OF SERVICE (DoS) ATTACKS ON SESSION INITIATION PROTOCOL (SIP)-BASED SYSTEMS USING RETURN ROUTABILITY CHECK FILTERING," filed Nov. 8, 2006, is hereby incorporated by reference. U.S. patent application Ser. No. 11/557,739, entitled "PREVENTION OF DENIAL OF SERVICE (DoS) ATTACKS ON SESSION INITIATION PROTOCOL (SIP)-BASED SYSTEMS USING METHOD VULNERABILITY FILTERING," filed Nov. 8, 2006, is hereby incorporated by reference. U.S. patent application Ser. No. 11/557,751, entitled "SYSTEM AND METHOD FOR TESTING NETWORK FIREWALL USING FINE GRANULARITY MEASUREMENTS," filed Nov. 8, 2006, is hereby incorporated by reference.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described above with respect to FIGS. 7, 10, and 11, the order of the blocks may differ in other implementations consistent with principles of the invention. Moreover, some blocks may be performed in parallel.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the exemplary embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving packets in a first network device;
   storing a first table including first criteria, wherein the first criteria identify session initiation packets used to create a session or session termination packets used to terminate the session, wherein the first criteria include a destination IP address and an associated destination port;
   storing a second table including second criteria, wherein the second criteria identify packets in the session created by the session initiation packets, wherein the second criteria include a source IP address and an associated source port, and a destination IP address and an associated destination port;
   determining, in a first processor, whether each of the received packets meets the first criteria in the first table;
   determining, in the first processor, that each of a first set of the received packets meets the first criteria;
   transmitting each of the first set of the received packets that the first processor has determined meets the first criteria to a second network device including a second processor different than the first processor;
   determining, in the first processor, that each of a second set of the received packets does not meet the first criteria;
   determining, in the first processor in response to each determination that the corresponding received packet in the second set does not meet the first criteria, whether the corresponding received packet in the second set meets the second criteria; and
   transmitting, in response to each determination that the corresponding received packet in the second set meets the second criteria, the corresponding packet toward a destination.

2. The method of claim 1, further comprising:
   receiving instructions, based on the first set of the packets sent to the second network device, to change the second criteria in the second table; and
   changing the second criteria based on the instructions.

3. The method of claim 2, further comprising:
   receiving packets in the second network device;
   determining whether the packets received in the second network device establish or terminate the session between user devices; and
   generating the instructions, based on the determination of whether the packets received in the second network device establish or the terminate session between user devices, and
   transmitting the instructions to the first network device for changing the second criteria.

4. The method of claim 3, wherein the packets to establish or terminate the session include Session Initiation Protocol (SIP) packets.

5. The method of claim 4, wherein storing the second table includes storing the second table in a Content Addressable Memory (CAM).

6. The method of claim 2, wherein receiving the packets in the first network device includes receiving the packets on a first input port, the method further comprising receiving the instructions on a second input port different than the first input port.

7. A system comprising:
   an input port to receive a packet;
   a memory to store criteria for determining whether the packet should be forwarded to a destination on a network, wherein the memory includes
      a first table including static criteria for determining whether the packet should be forwarded to the destination, wherein the static criteria include a destination IP address and an associated destination port, and
      a second table including dynamic criteria for determining whether the packet should be forwarded to the destination, wherein the second criteria include a source IP address and an associated source port, and a destination IP address and an associated destination port;
   an output port to forward the packet; and
   a processor configured to determine whether or not the packet matches the static criteria in the first table,
      wherein when the processor determines that the packet matches the static criteria the output port is configured to forward the packet to the destination,
      wherein the processor is configured to determine, in response to the processor having determined that the packet does not match the static criteria, whether the packet matches the dynamic criteria, and
      wherein, in response to the processor determining that the packet matches the dynamic criteria, the output port is configured to forward the packet to the destination.

8. The system of claim 7, wherein the static criteria identify session initiation packets used to create a session or session termination packets used to terminate the session, and wherein the dynamic criteria identify packets in the session created by the session initiation packets.

9. The system of claim 8, wherein the processor is a first processor, wherein the output port is configured to send the packet to a second processor different than the first processor when the first processor determines that the packet meets the static criteria, wherein the first processor is configured to receive instructions, based on the packet sent to the second processor, to change the dynamic criteria; and wherein the first processor is configured to change the dynamic criteria based on the instructions.

10. The system of claim 9, wherein the session initiation packets or the session termination packets include a Session Initiation Protocol (SIP) INVITE message, a SIP OK message, or a SIP BYE message.

11. The system of claim 10, wherein the static criteria include a destination internet protocol (IP) address and an associated destination port.

12. The system of claim 10, wherein the dynamic criteria include a source IP address and an associated source port, and a destination IP address and an associated destination port.

13. The system of claim 9, further comprising a dedicated input port to receive the instructions.

14. The system of claim 9, further comprising an access control list (ACL) to authenticate a source of the instructions.

15. The system of claim 9, farther comprising a cryptographic authenticator to receive the instructions.

16. A method comprising:
  receiving packets on an input port from a first network comprising a first device;
  transmitting packets on an output port to a second network comprising a second device;
  storing a first table and a second table in a memory,
    wherein the first table includes static criteria for determining whether the received packets should be forwarded to destinations, and wherein the static criteria include a destination IP address and an associated destination port, and
    wherein the second table includes dynamic criteria for determining whether the received packets should be forwarded to destinations, and wherein the dynamic criteria include a source IP address and an associated source port, and a destination IP address and an associated destination port;
  determining, in a first processor, whether each of the received packets matches the static criteria, including determining that each of a first set of the received packets matches the static criteria and determining that each of a second set of the received packets does not match the static criteria;
  transmitting each of the first set of the received packets that the first processor determined matches the static criteria toward a device having a second processor different than the first processor; and
  determining, in the second processor, that one or more of the first set of the received packets establishes or terminates a session between the first device and the second device;
  changing the dynamic criteria based on the one or more of the first set of the received packets determined to establish or terminate the session between the first device and the second device;
  determining, in the first processor in response to each determination that the second set of the received packets does not match the static criteria, whether the corresponding received packet matches the dynamic criteria; and
  transmitting, in response to each determination that the corresponding packet matches the dynamic criteria, the corresponding packet toward the destination.

17. The method of claim 16, further comprising determining, based on the static criteria, whether the one or more of the received packets are a type to establish or terminate the session between the first device and the second device.

18. The method of claim 17, wherein the type of packet to establish or terminate a session is a Session Initiation Protocol (SIP) packet.

19. The method of claim 18,
  wherein the static criteria include a destination internet protocol (IP) address and an associated destination port; and
  wherein the dynamic criteria comprise a source IP address and an associated source port and a destination IP address and an associated destination port.

* * * * *